United States Patent
Joshi et al.

(10) Patent No.: US 6,667,711 B1
(45) Date of Patent: Dec. 23, 2003

(54) METHOD AND APPARATUS FOR DISCERNING DEGRADATION OF ELECTROMAGNETIC RADIATING TUBES

(75) Inventors: Narayan R. Joshi, Beaumont, TX (US); David W. Brock, San Diego, CA (US); Stephen D. Russell, San Diego, CA (US); Shannon D. Kasa, San Diego, CA (US); Graham A. Garcia, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/302,319

(22) Filed: Nov. 20, 2002

Related U.S. Application Data

(63) Continuation-in-part of application No. 09/871,474, filed on May 31, 2001, now Pat. No. 6,489,919.

(51) Int. Cl.[7] .................................. G01S 7/40
(52) U.S. Cl. ........................ 342/165; 342/173
(58) Field of Search ................ 342/165–174

(56) References Cited

U.S. PATENT DOCUMENTS

| | | | |
|---|---|---|---|
| 3,792,613 A | * | 2/1974 | Couture ....................... 73/629 |
| 3,950,750 A | | 4/1976 | Churchill et al. |
| 4,053,890 A | | 10/1977 | Woodson, III et al. |
| 4,145,692 A | | 3/1979 | Armstrong et al. |
| 4,319,247 A | | 3/1982 | Warren |
| 4,499,469 A | | 2/1985 | Kesterson |
| 4,554,636 A | * | 11/1985 | Maggi et al. ............... 702/118 |
| 4,994,811 A | | 2/1991 | Moreira |
| 5,012,251 A | | 4/1991 | Kennedy et al. |
| 5,262,787 A | | 11/1993 | Wilson et al. |
| 5,375,126 A | * | 12/1994 | Wallace ....................... 714/712 |
| 5,969,664 A | | 10/1999 | Bedford et al. |
| 6,177,904 B1 | | 1/2001 | Coenen et al. |
| 6,489,919 B1 | * | 12/2002 | Brock .......................... 342/165 |

FOREIGN PATENT DOCUMENTS

| | | | |
|---|---|---|---|
| GB | 2228577 A | * | 8/1990 |

* cited by examiner

Primary Examiner—John B. Sotomayor
(74) Attorney, Agent, or Firm—Peter A. Lipovsky; Michael A. Kagan; Celia C. Dunham

(57) ABSTRACT

The invention is designed to employ one or a multitude of sensors designed to allow operational monitoring of any of a variety of electromagnetic radiating tubes. Monitoring is conducted to detect a degradation in performance which can be used as a factor in deciding whether tube replacement is justified. Contrary to some past approaches that focused on averaged tube outputs, the invention is designed to examine individual tube pulses.

6 Claims, 6 Drawing Sheets

METHOD AND APPARATUS FOR DISCERNING DEGRADATION OF ELECTROMAGNETIC RADIATING TUBES

Cross-reference to Related Application

This application is a continuation-in-part of U.S. patent application Ser. No. 09/871,474 filed on May 31 2001, now U.S. Pat. No. 6,489,919 B1 incorporated by reference herein.

BACKGROUND OF THE INVENTION

Electromagnetic radiating devices, such as microwave tubes, are used in a large variety of communication, RADAR, and surveillance systems. Examples of microwave tubes include linear beam types such as traveling wave tubes (TWT) and cross-field amplifiers (XFA). Other microwave devices include the magnetron, klystron and solid state devices. The commonality for these devices is the emission of electromagnetic energy in the microwave, radio frequency (RF) or other band with wavelengths larger than the infrared region of the spectrum. Typically, microwave tubes are robust and very expensive, however since they are used in many critical systems they are routinely replaced prior to their failure to maximize system up-time. This approach increases the lifetime cost of the systems as full-life usage of the tubes is often not realized. Thus a need exists for a way of discerning microwave tube degradation so that useful microwave tubes are not replaced prematurely.

SUMMARY OF THE INVENTION

The invention is designed to employ one or a multitude of sensors designed to allow operational monitoring of any of a variety of electromagnetic radiating tubes. Monitoring is conducted to detect a degradation in performance which can be used as a factor in deciding whether tube replacement is justified. Contrary to some past approaches that focused on averaged tube outputs, the invention is designed to examine individual tube pulses.

An object of this invention is to provide a technique for testing electromagnetic radiating tubes.

A further object of this invention is to provide a technique for testing microwave radiating tubes.

Still a further object of the invention is to provide a technique that tests the transmitting tube of a radar system.

Still yet another object of this invention is to provide a technique that tests the transmitting tube of a radar system by exploiting a characteristic indicative of a degrading transmitting tube.

Still a further object of this invention is to provide a technique that tests the transmitting tube of a radar system by assessing acoustic emissions of the transmitting tube.

Still a another object of this invention is to provide a technique that tests the transmitting tube of a radar system by assessing current characteristics corresponding to the tube.

Other objects, advantages and new features of the invention will become apparent from the following detailed description of the invention when considered in conjunction with the accompanied drawings.

DESCRIPTION OF THE PREFERRED EMBODIMENT

Figure 1:
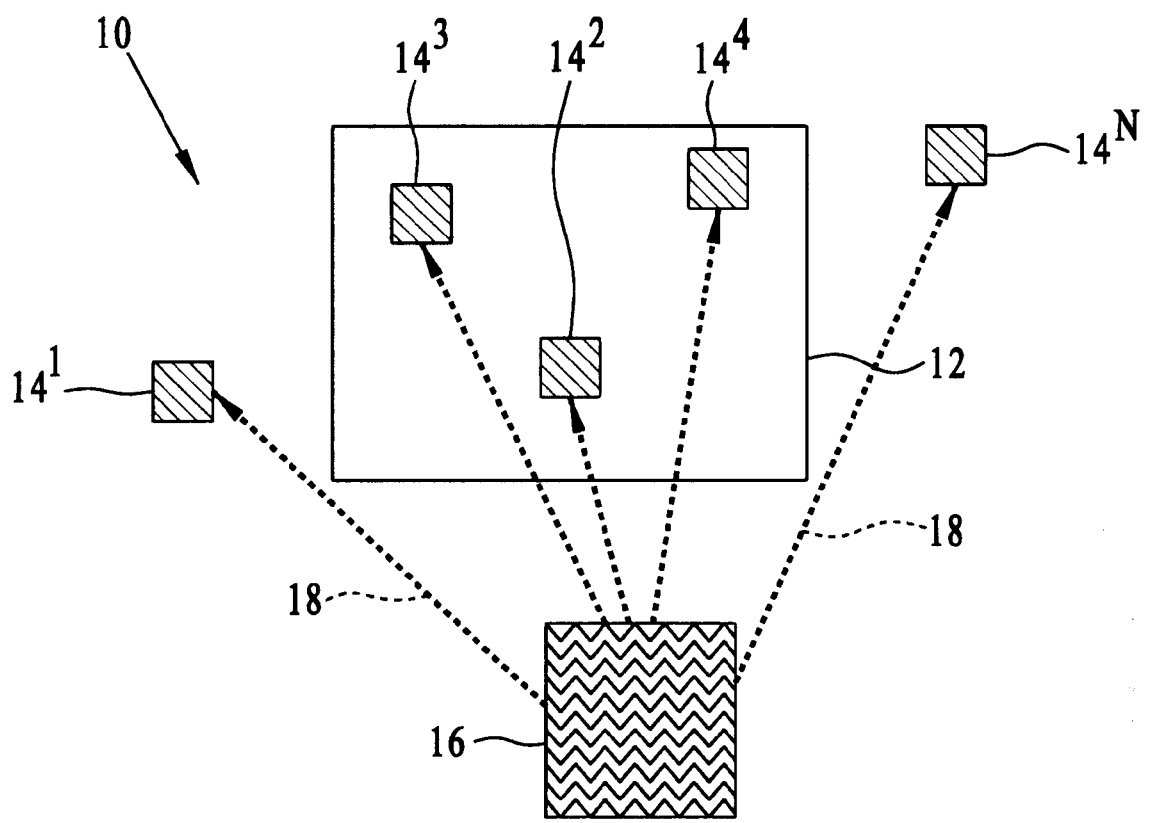
FIG. 1 is a general block diagram illustrating an electromagnetic radiating device wherein sensors are disposed to monitor the device in accordance with the invention.

FIG. 1 schematically illustrates an apparatus 10 as may be used for discerning degradation of an electromagnetic radiating device 12. Apparatus 10 includes one or more sensors $14^1, 14^2, \ldots, 14^N$) that are disposed in a manner to detect a characteristic signal or signals from electromagnetic device 12 that will be used to ascertain whether device 12 is degrading in performance. Such sensors may be physically attached to, incorporated within, or placed remotely about electromagnetic device 12. The sensors are operably coupled to a data processor 16 as by connections 18. Connections 18 may be any considered suitable such as for example electrical, mechanical, optical (e.g. infrared link), magnetic or electromagnetic (e.g. RF link). Processor 16 is used to compare a characteristic signal from one or more sensors to an algorithm to identify degradation of the electromagnetic device.

Figure 2:
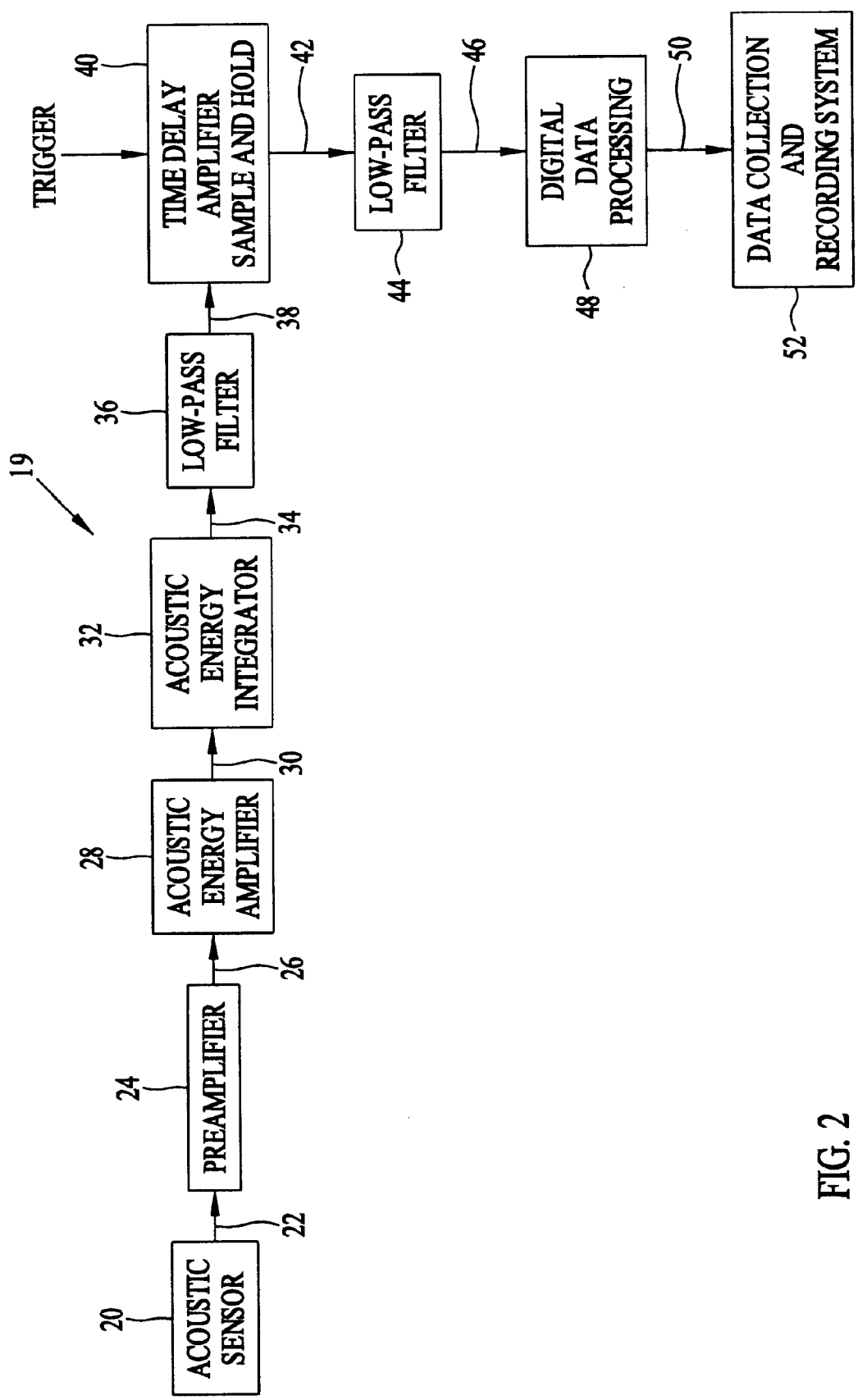
FIG. 2 illustrates an exemplary acoustic emission technique for monitoring an electromagnetic radiating device according to an embodiment of the invention.

By way of example, acoustic emission sensor $14^1$ is used to monitor a 2J56 magnetron. The acoustic sensors may be placed at a variety of positions so that a precise location of magnetron anomalies may be determined. FIG. 2 illustrates an embodiment of an acoustic emission sensing system 19 such as may be used in the invention.

System 19 uses a conventional acoustic sensor 20 that is disposed within, on, or near an electromagnetic energy generator desired to be monitored. In radar applications, such a generator may take the form of a magnetron, a traveling wave tube or a klystron, for example. Though these tubes are provided by way of example, the invention is considered useful with a great variety of tubes,.of radar type or otherwise.

Output 22 of acoustic sensor 20 is fed to a preamplifier 24 having three gain settings of 20 dB, 40 dB and 60 dB with a high input impedance. Preamplifier output 26 is then fed to an acoustic energy amplifier 28 having a total gain achievable of 41 dB in 3 dB steps. Suitably amplified signal 30 is then integrated over a preselected time period via integrator 32, pulse output 34 having its pulse shape cleaned in low-pass filter 36. The filtered output 38 has its peak voltage sampled in sample-and-hold element 40. Sampled voltage 42 is then cleaned in low-pass filter 44 to provide a cleaned output signal 46.

This output may be used directly for examination purposes however a preferred embodiment of the invention has output 46 go to a digital data processor 48, which uses predetermined algorithms to assess the condition of the transmitting tube based upon an acoustic characteristic. These algorithms are considered within the purview of those skilled in the art and can be statistically and/or empirically derived. An output 50 of the processor is then sent to a data collection and storage system 52 whose files are then made available for observation by a radar system operator.

Figure 3A:
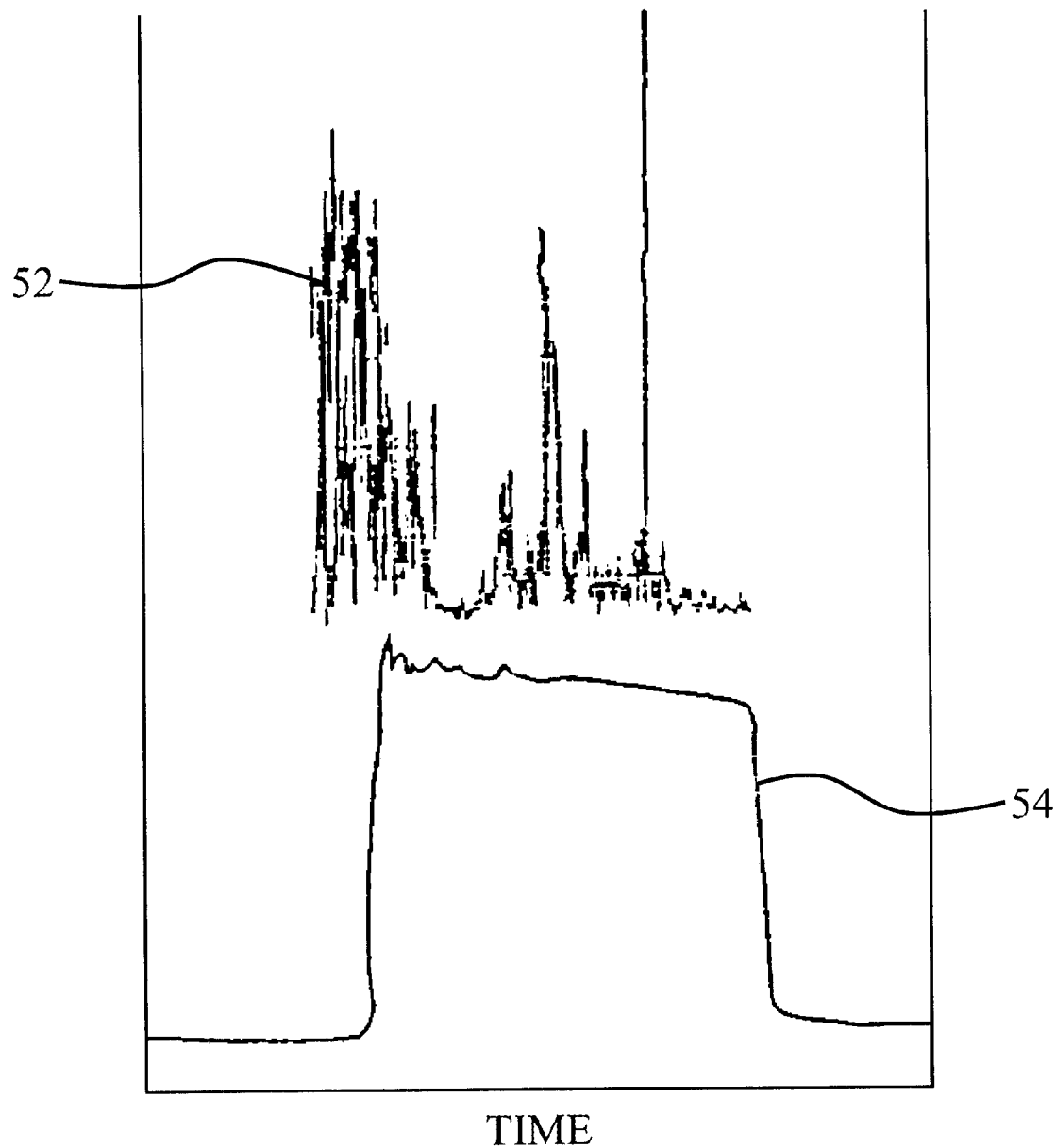
FIGS. 3A–3B illustrate acoustic emissions of a non-degraded and degraded electromagnetic radiating source, respectively.
Figure 3B:
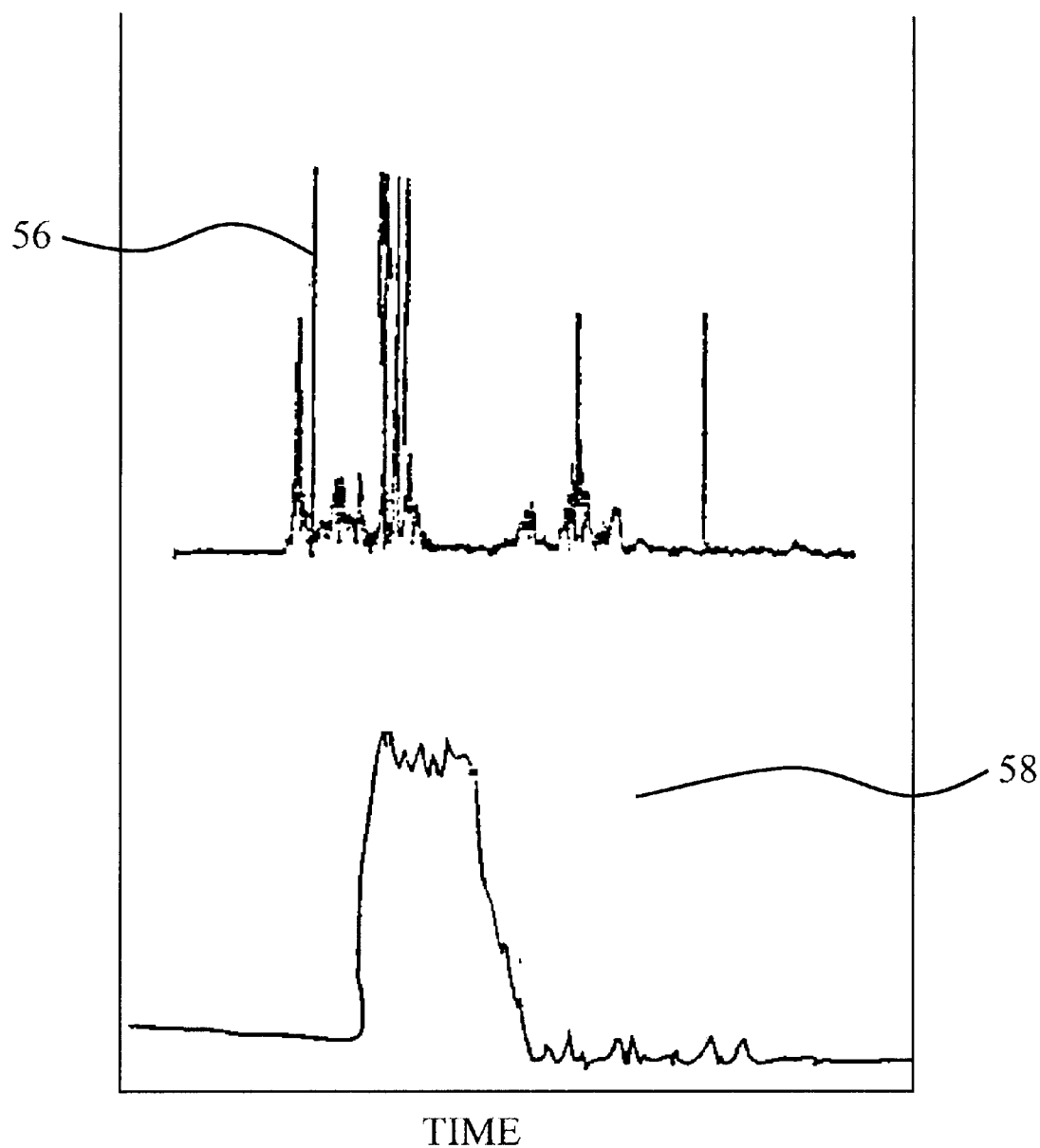

FIG. 3A shows a fast Fourier transform of output signal 52 (in volts) of an acoustic emission sensor when a good RF signal 54 is emitted. FIG. 3B shows a characteristic output signal 56 (fast Fourier transformed) of an acoustic emission sensor monitoring a 2J56 magnetron when a bad RF signal 58 is emitted. Output signal 56 has an anomalous intensity which can then be appropriately analyzed by the data processor 48. In this case, a decrease in acoustic signal corresponds to a failed RF pulse. Examples of acoustic emission sensors include piezoelectric devices, surface acoustic wave devices, and microelectromechanical systems (MEMS) devices.

Figure 4:
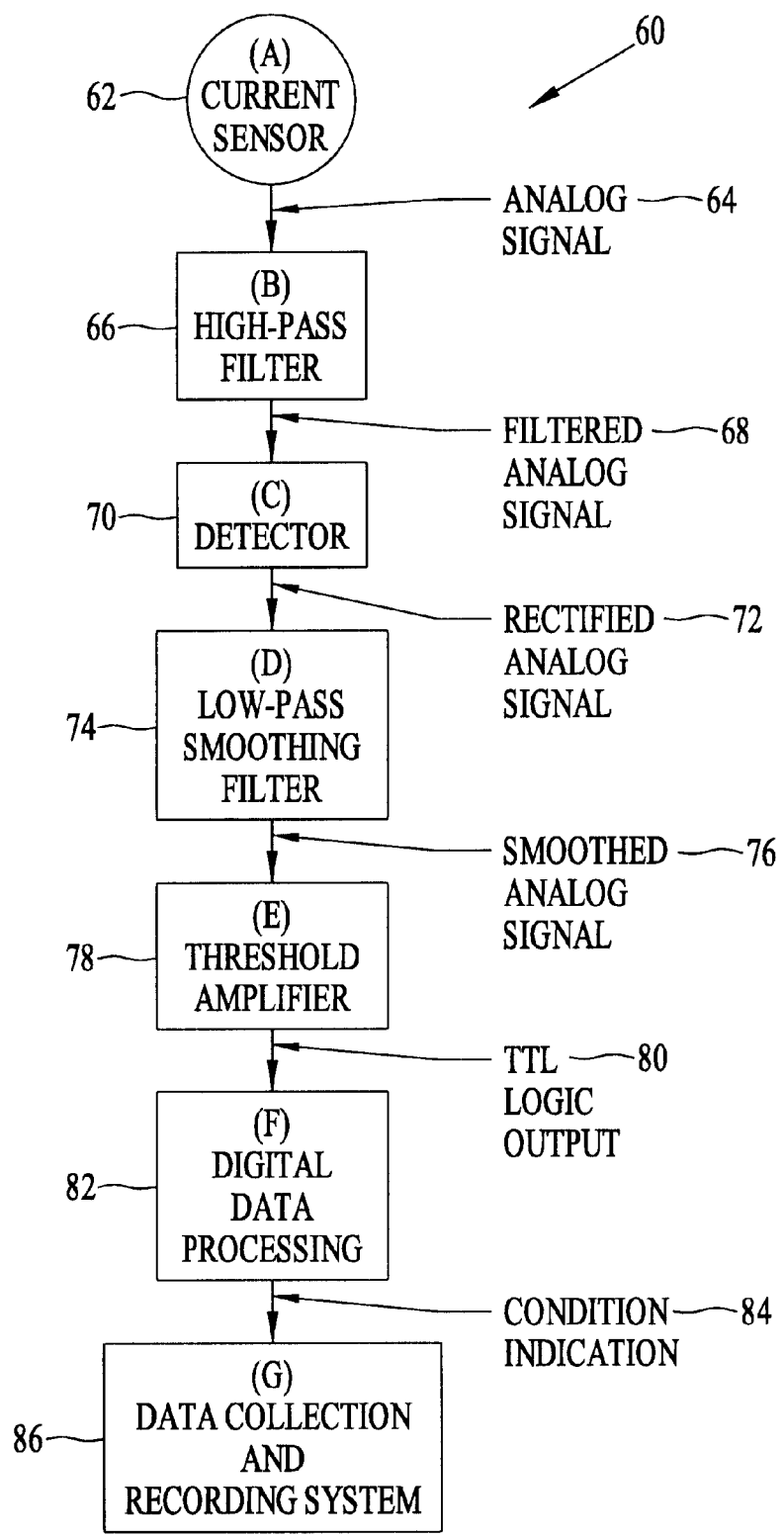
FIG. 4 illustrates an exemplary current sensing technique for monitoring an electromagnetic radiating device according to an embodiment of the invention.

Another example of a sensor arrangement is illustrated in FIG. 4. A current sensor system 60 uses a conventional current sensor 62 that is applied directly to the cathode of a radar transmitting tube under test. Typical tubes used in high power radio frequency applications incorporate a pulse type microwave amplifier to amplify a radar signal. An example of this is a pulsed magnetron tube. Though this specific type of tube is provided as an example, the invention is considered useful with a great variety of tubes, pulsed and otherwise.

The output of sensor 62 is an analog voltage signal 64. Signal 64 is fed to a high-pass filter 66 used to pass frequency components known to be indicative of faulty radar pulses. It has been observed that faulty radar pulses have a significantly increased content of undesired high frequency components that are directly related to the current sensed at the transmitting tube's cathode lead.

For microwave frequency radar transmissions of the previously cited pulsed magnetron tube, a suitable filter, for example, is a Chebyshev design that blocks frequency components below 8 MHZ and passing those above 8 MHz. Filtered analog voltage output 68 is fed to a detector 70, wherein a rectified analog output voltage 72 is produced whose amplitude is proportional to the amplitude of the high frequency components passing through high-pass filter 66.

A smoothing operation is next performed wherein rectified voltage 72 is fed to a low-pass smoothing filter 74 to take out undesired fluctuations generated by the rectified detection process. Selection of such a smoothing filter is considered within the discretion of one skilled in the art, however, for example, it is know that for microwave radar transmissions, a suitable filter is a 15 MHZ low-pass.

Though the output of filter 74 may be used directly for analysis purposes, a preferred embodiment of the invention employs a threshold operation to facilitate use of the test data. For example, smoothed analog output voltage 76 can be provided as an input to a threshold amplifier 78 having a logic output 80 of the TTL (transistor-transistor logic) type.

In this example, if the amplitude of the analog voltage going into amplifier 78 is less than 0.3 volts, the amplifier generates a TTL output 80 of 0 (voltage<0.8 volts) indicating a good radar pulse. If the amplitude of a pulse going into amplifier 78 is greater than 0.3 volts, then the amplifier generates a TTL output 80 of 1 (voltage>2.0 volts) indicating that the pulse from the radar was bad.

The TTL logic output 80 from threshold amplifier 78 then goes to a digital data processor 82, which uses predetermined algorithms to assess the condition of the transmitting tube based upon the rate of occurrence of the bad radar pulses. These algorithms are considered within the purview of those skilled in the art and can be statistically and/or empirically derived. An output of the processor 84 is then sent to a data collection and storage system 86 whose files are then available for observation by a radar system operator.

Figure 5A:
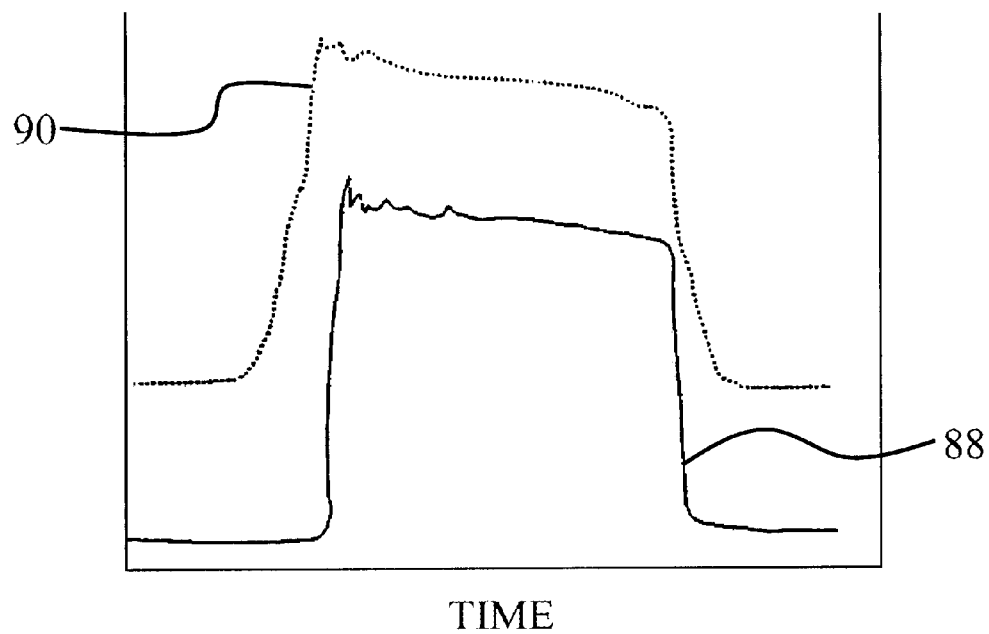
FIGS. 5A–5B illustrate current sensed of a non-degraded and degraded electromagnetic radiating source, respectively.
Figure 5B:
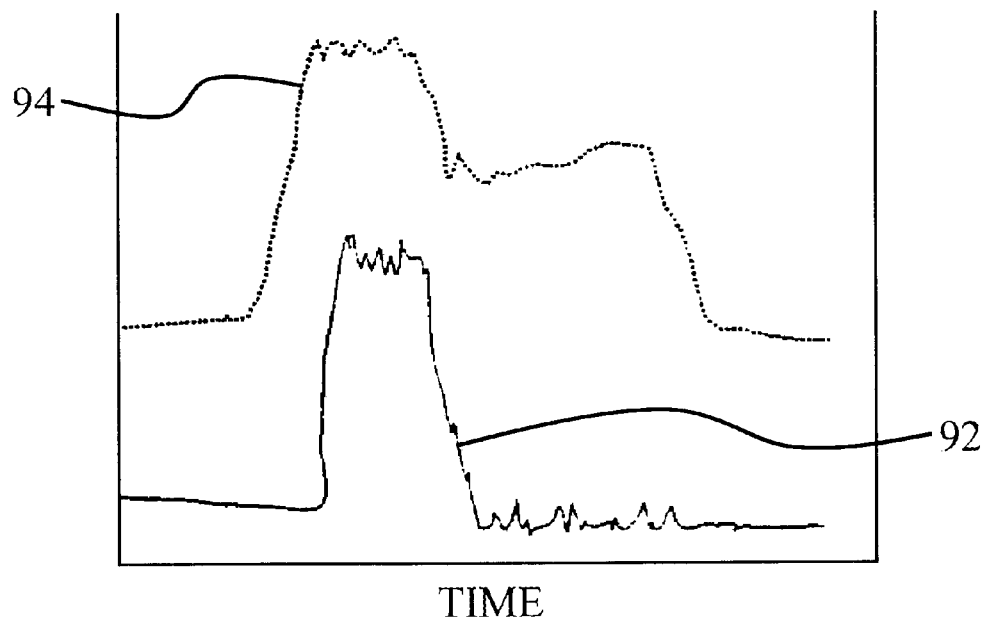

FIG. 5A shows a characteristic output signal 88 (in amperes) of a cathode current sensor monitoring a 2J56 magnetron when a good RF signal 90 is emitted. FIG. 5B shows a characteristic output signal 92 of a cathode current sensor monitoring a 2J56 magnetron when a bad RF signal 94 is emitted. Output signal 92 has an anomalous temporal shape which can then be appropriately analyzed by data processor 82.

The invention provides a method and apparatus for detecting and analyzing individual electromagnetic pulses (e.g. microwaves), not just an average of these pulses. It further provides the ability to discern degradation of the electromagnetic radiating devices by using individually identified pulses in a prognostic algorithm. This invention, when used in a RADAR system, will provide improvements in readiness, performance, maintainability and reliability by keeping personnel constantly apprized of the condition of the RADAR's high-power microwave tubes. The invention will reduce maintenance labor by reducing the time needed to locate and correct system malfunctions. It should reduce the number of required maintenance personnel, and their training requirements.

The invention may be applied to any electromagnetic emitting device, and may make use of any variety or plurality of sensors including but not limited to electrical, magnetic, electromagnetic, thermal, acoustic, optical, ionizing radiation and chemical sensors. The parameters used in the prognostic algorithm may be selected for optimized performance based on the specific device being monitored. Though the invention is considered highly usable with pulsed type transmitting tubes, other types of tubes are also considered usable with the invention, including a wide variety of electromagnetic radiating tubes.

Obviously, many modifications and variations of the invention are possible in light of the above description. It is therefore to be understood that within the scope of the claims the invention may be practiced otherwise than as has been specifically described.

What is claimed is:

1. A method for detecting degradation of a radar transmitting tube comprising the steps of:

operating said tube; and analyzing an individual pulse of said tube for anomalous characteristics including collecting acoustic emissions corresponding to said individual pulse of said tube;

equating an acoustic emission having a predetermined characteristic as indicative of a faulty tube, wherein said radar transmitting tube is one chosen from a group including a magnetron, a traveling wave tube and a klystron.

2. The method according to claim 1 wherein said method includes:

utilizing a current sensor to sense current at a cathode of said tube; and equating current corresponding to a pulse having a predetermined characteristic as indicative of a faulty tube.

3. An apparatus for detecting degradation of a radar transmitting tube comprising:

an operating radiating tube system including said radar transmitting tube; and means for analyzing an individual pulse of said tube for anomalous characteristics, said means for analyzing including
    acoustic emission collecting means for collecting acoustic emissions corresponding to an individual pulse of said tube; and
    means for processing said acoustic emissions wherein an acoustic emission having a predetermined characteristic is considered indicative of a faulty tube.

4. The apparatus of claim 3 wherein said radar transmitting tube is one chosen from a group including a magnetron, a traveling wave tube and a klystron.

5. The apparatus of claim 3 wherein said apparatus includes:
    cathode current sensing means for sensing current at a cathode of said tube; and
    means for processing said current sensed at said cathode wherein current corresponding to pulses having a predetermined characteristic is considered indicative of a faulty tube.

6. The apparatus of claim 5 wherein said radar transmitting tube is one chosen from a group including a magnetron, a traveling wave tube and a klystron.

* * * * *